US012100332B2

(12) United States Patent
Chen

(10) Patent No.: US 12,100,332 B2
(45) Date of Patent: Sep. 24, 2024

(54) COMPENSATION METHOD FOR DISPLAY PANEL AND COMPENSATION DEVICE THEREOF

(71) Applicant: TCL China Star Optoelectronics Technology Co., Ltd., Guangdong (CN)

(72) Inventor: Yi Chen, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/089,611

(22) Filed: Dec. 28, 2022

(65) Prior Publication Data

US 2024/0119885 A1 Apr. 11, 2024

(30) Foreign Application Priority Data

Sep. 29, 2022 (CN) ......................... 202211199744.1

(51) Int. Cl.
*G09G 3/20* (2006.01)
*G09G 3/32* (2016.01)

(52) U.S. Cl.
CPC ............ *G09G 3/2074* (2013.01); *G09G 3/32* (2013.01); *G09G 2320/0242* (2013.01); *G09G 2320/0271* (2013.01)

(58) Field of Classification Search
CPC ................... G09G 3/2074; G09G 3/32; G09G 2320/0242; G09G 2320/0271; G09G 3/2003; G09G 2320/0693; G09G 2360/16; G09G 2320/0276; G09G 2320/0666
See application file for complete search history.

(56) References Cited

U.S. PATENT DOCUMENTS

| | | | | |
|---|---|---|---|---|
| 10,885,856 | B2 * | 1/2021 | Tan | G09G 3/3225 |
| 10,997,898 | B2 * | 5/2021 | Wang | G09G 3/3291 |
| 11,200,844 | B2 * | 12/2021 | Hsu | G09G 3/3225 |
| 2018/0197453 | A1 * | 7/2018 | Lee | G09G 3/32 |
| 2019/0221171 | A1 * | 7/2019 | Zha | G09G 3/342 |
| 2020/0051508 | A1 * | 2/2020 | Tan | G09G 3/3291 |
| 2020/0126499 | A1 * | 4/2020 | Huang | G09G 3/3607 |
| 2020/0402446 | A1 * | 12/2020 | Wang | G09G 3/3208 |
| 2021/0049966 | A1 * | 2/2021 | Hsu | G09G 3/3258 |
| 2021/0335256 | A1 * | 10/2021 | Yin | G09G 3/3266 |
| 2022/0327984 | A1 * | 10/2022 | Zhao | G09G 5/005 |
| 2022/0335876 | A1 * | 10/2022 | Chen | G09G 3/20 |

(Continued)

*Primary Examiner* — Michael J Jansen, II

(57) ABSTRACT

A compensation method for a display panel and a compensation device thereof are provided in embodiments of the present application. The compensation method for the display panel includes: for each single gray scale image of a preset color displayed by a panel to be compensated, obtaining a corresponding image parameter group, for each single gray scale image of the preset color displayed by the panel to be compensated, obtaining a corresponding fitting determination coefficient according to the image parameter group, obtaining gray scale binding points of the preset color of the panel to be compensated according to the fitting determination coefficients, obtaining compensation parameters corresponding to the gray scale binding points of the preset color, and performing display compensation on the panel to be compensated according to the compensation parameters corresponding to the gray scale binding points.

14 Claims, 2 Drawing Sheets

(56) References Cited

U.S. PATENT DOCUMENTS

| | | | | |
|---|---|---|---|---|
| 2022/0343827 A1* | 10/2022 | Zhan | G09G 3/2074 | |
| 2023/0029179 A1* | 1/2023 | Chen | G09G 3/006 | |
| 2023/0069956 A1* | 3/2023 | Chen | G09G 3/2092 | |
| 2023/0186815 A1* | 6/2023 | Gao | G09G 3/2003 | 345/690 |

* cited by examiner

COMPENSATION METHOD FOR DISPLAY PANEL AND COMPENSATION DEVICE THEREOF

RELATED APPLICATION

This application claims the benefit of priority of Chinese Patent Application No. 202211199744.1 filed on Sep. 29, 2022, the contents of which are incorporated herein by reference in their entirety.

TECHNICAL FIELD

The present application relates to the technical field of display technology, and in particular to a compensation method for a display panel and compensation device thereof.

BACKGROUND

At present, gray scales selected of a red light picture, a green light picture and a blue light picture are same in display defect compensation of a light emitting diode (LED) display panels. However, relationships between a luminous current and brightness of a red light source, a green light source and a blue light source are not consistent in a me gray scale, resulting in errors in interpolation compensation for other unselected gray scale pictures, and leading to color deviation of a white light picture displayed on a display panel.

Therefore, it is urgent to provide a compensation method for a display panel and a compensation device thereof to solve the above technical problem.

SUMMARY

A compensation method for a display panel and a compensation device thereof are provided by the present application, which can alleviate a technical problem of color deviation of a white light picture of a display panel after a display defect compensation due to gray scales selected of a red light picture, a green light picture and a blue light picture in the display defect compensation of the display panels being same.

A compensation method for a display panel is provided by the present application, including:

for each single gray scale image of a preset color displayed by a panel to be compensated, obtaining a corresponding image parameter group;

for each single gray scale image of the preset color displayed by the panel to be compensated, obtaining a corresponding fitting determination coefficient according to the image parameter group;

obtaining gray scale binding points of the preset color of the panel to be compensated according to the fitting determination coefficients; and obtaining compensation parameters corresponding to the gray scale binding points of the preset color, and performing display compensation on the panel to be compensated according to the compensation parameters corresponding to the gray scale binding points, wherein the preset color includes at least one sub-pixel color of the panel to be compensated, the image parameter group includes at least one image parameter pair, and the image parameter pair includes a first luminous current value and a first luminance value corresponding to the first luminous current value.

Optionally, for each single gray scale image of the preset color displayed by the panel to be compensated, obtaining the corresponding fitting determination coefficient according to the image parameter group includes steps of:

for each gray scale image of the preset color displayed by the panel to be compensated, obtaining a corresponding first determination coefficient according to the image parameter group corresponding to a gray scale of the single gray scale image; and determining whether the first determination coefficient is greater than a first threshold, and defining the first determination coefficient as the fitting determination coefficient if yes.

Optionally, for each gray scale image of the preset color displayed by the panel to be compensated, obtaining a corresponding first determination coefficient according to the image parameter group for each gray scale includes steps of:

for each gray scale establishing a corresponding first relational expression according to the image parameter pair for each corresponding gray scale image of the preset color displayed by the panel to be compensated; and for each gray scale image of the preset color displayed by the panel to be compensated, obtaining the first determination coefficient according to the first relational expression for each corresponding gray scale and the image parameter pair for each corresponding gray scale.

Optionally, determining whether the first determination coefficient is greater than the first threshold includes steps of:

obtaining a second determination coefficient according to the image parameter pair of the gray scale corresponding to a first determination coefficient less than or equal to the first threshold if the first determination coefficient is not greater than the first threshold; and determining whether the second determination coefficient is greater than a second threshold, and defining the second determination coefficient as the fitting determination coefficient if yes.

Optionally, obtaining the second determination coefficient according to the image parameter pair of the gray scale corresponding to the first determination coefficient less than or equal to the first threshold includes steps of:

for each second type of gray scale, establishing a corresponding second relational expression according to the image parameter pair for each corresponding second type of gray scale image of the preset color displayed by the panel to be compensated; and for each second type of gray scale image of the preset color displayed by the panel to be compensated, obtaining the second determination coefficient according to the second relational expression for each second type of gray scale and the image parameter pair for each second type of gray scale; and wherein the second type of gray scale is a gray scale corresponding to a first determination coefficient less than or equal to the first threshold.

Optionally, determining whether the second determination coefficient is greater than the second threshold further includes step of:

obtaining a third determination coefficient according to the image parameter pair of the gray scale corresponding to a second determination coefficient less than or equal to the second threshold if the second determination coefficient is not greater than the second threshold, and defining the third determination coefficient as the fitting determination coefficient.

Optionally, obtaining the third determination coefficient according to the image parameter pair of the gray scale corresponding to the second determination coefficient less than or equal to the second threshold, and defining the third determination coefficient as the fitting determination coefficient includes steps of:

for each third type of gray scale, establishing a third relational expression according to the image parameter pair for each corresponding third type of gray scale image of the preset color displayed by panel to be compensated; and for each third type of gray scale image of the preset color displayed by the panel to be compensated, obtaining the third determination coefficient according to the third relational expression for each corresponding third type of gray scale and the image parameter pair corresponding to the third type of gray scale, and defining the third determination coefficient as the fitting determination coefficient; and wherein the third type of gray scale is a gray scale corresponding to a second determination coefficient less than or equal to the second threshold.

Optionally, for each single gray scale image of the preset color displayed by the panel to be compensated, obtaining the fitting determination coefficient according to the image parameter group includes steps of:

for each gray scale, establishing a corresponding plurality of fourth relational expressions according to the image parameter pair for each corresponding gray scale image of the preset color displayed by the panel to be compensated;

for each gray scale image of the preset color displayed by the panel to be compensated, respectively obtaining a corresponding plurality of first predetermined coefficients according to the plurality of fourth relational expressions for each corresponding gray scale and the image parameter pairs for each corresponding gray scale; and defining a maximum value of the plurality of first predetermined coefficients corresponding to the gray scale as the fitting determination coefficient.

Optionally, obtaining the gray scale binding point of the preset color of the panel to be compensated according to the fitting determination coefficients includes steps of:

obtaining at least one corresponding gray scale region according to the fitting determination coefficients; and selecting at least one gray scale in the gray scale region as the gray scale binding point; and wherein gray scales are consecutive position integers in the gray scale region.

Optionally, the gray scale binding point is selected from an endpoint of the gray scale region.

Optionally, obtaining the compensation parameters corresponding to the gray scale binding points of the preset color and performing display compensation on the panel to be compensated according to the compensation parameters corresponding to the gray scale binding points includes steps of:

obtaining a first compensation parameter corresponding to adjacent two of the gray scale binding points of the preset color;

obtaining a second compensation parameter corresponding to a gray scale in a gray scale region between the adjacent two of gray scale binding points according to a relational expression corresponding to the fitting determination coefficients of a plurality of gray scales in the gray scale region between the adjacent two of gray scale binding points; and performing display compensation on the panel to be compensated according to the first compensation parameter and the second compensation parameter.

Optionally, the panel to be compensated includes pixels, each of the pixels includes a plurality of types of sub-pixels, each of the types of sub-pixels corresponds to a different color, and the preset colors includes corresponding colors for each type of the sub-pixels.

A compensation device for a display panel also provided by the present application, including:

a parameter collection unit configured for each gray scale image of a preset color displayed by a panel to be compensated to obtain an image parameter group;

a fitting unit configured for each gray scale image of the preset color displayed by the panel to be compensated to obtain a fitting determination coefficient according to the image parameter group;

a gray scale selection unit configured to obtain gray scale binding points of the preset color of the panel to be compensated according to the fitting determination coefficient; and a compensation unit configured to obtain a compensation parameter corresponding to the gray scale binding point of the preset color, and performing display compensation on the panel to be compensated according to the compensation parameter corresponding to the gray scale binding point, wherein the preset color includes at least one sub-pixel color of the panel to be compensated, the image parameter group includes at least one image parameter pair, the image parameter pair includes a first luminous current value and a first luminance value corresponding to the first luminous current value.

The fitting determination coefficients are obtained according to the image parameter groups of the preset color image displayed by the panel to be compensated so as to obtain the gray scale binding point of the preset color image displayed by the panel to be compensated by the present application, which beneficial to reduce compensation errors of other gray scales that are not selected as the gray scale binding point, and improve a problem of color deviation of a white picture of a compensated display panel.

BRIEF DESCRIPTION OF THE DRAWINGS

In order to more clearly illustrate the embodiments or the technical solutions of the existing art, the drawings illustrating the embodiments, or the existing art will be briefly described below. The drawings in the following description merely illustrate some embodiments of the present application. Other drawings may also be obtained by those skilled in the art according to these figures without paying creative work.

DETAILED DESCRIPTION OF THE EMBODIMENTS

Figure 1:
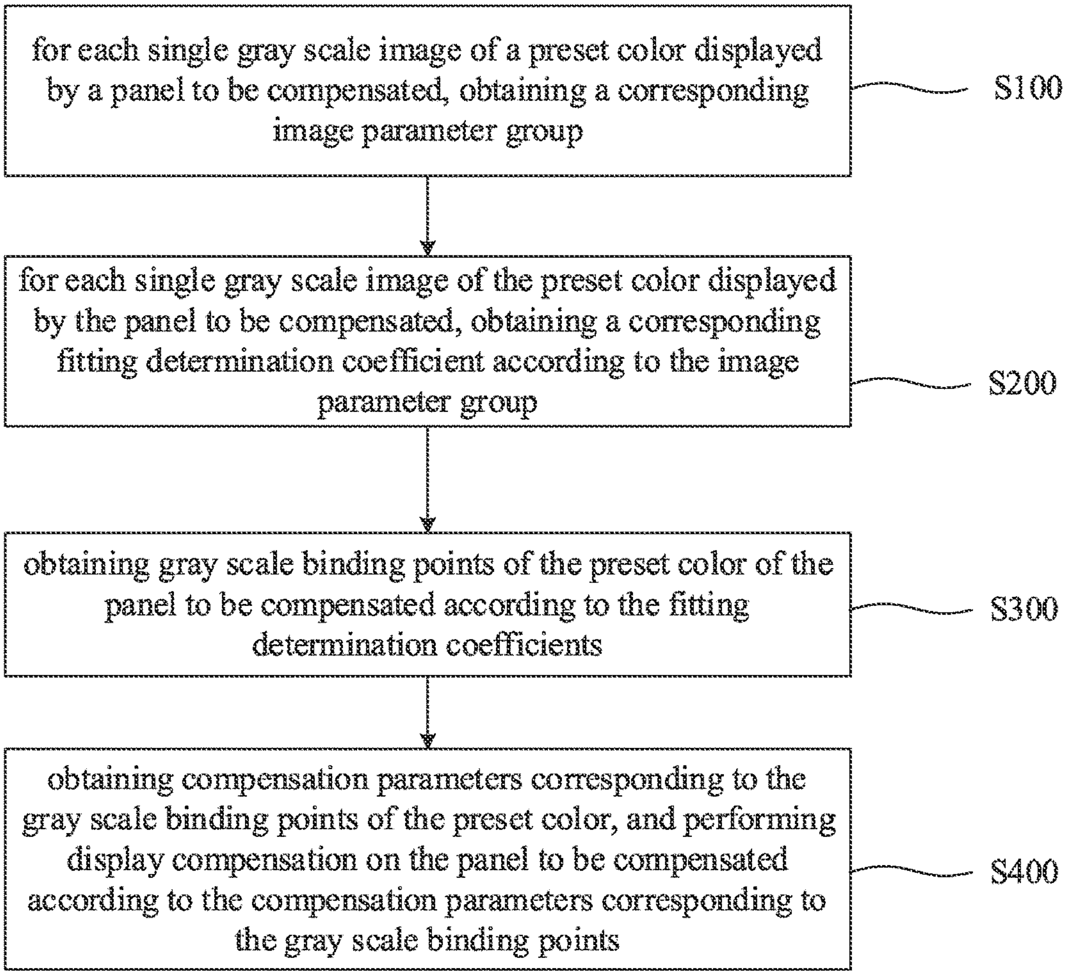
FIG. 1 is a step flow diagram of a compensation method for a display panel provided by an embodiment of the present application.

The technical solutions in the embodiments of the present application will be clearly and completely described below with reference to the drawings in the embodiments of the present application. Obviously, the described embodiments are only a part of the embodiments of the present application, but not all embodiments. Based on the embodiments in the present application, all other embodiments obtained by those skilled in the art without creative work should fall within the protection scope of the present application. In addition, it should be understood that the specific embodiments described herein are only used to illustrate and explain the present application, but not to limit the present application. In this application, unless otherwise stated, the directional words used such as "upper" and "lower" generally refer to the upper and lower sides of the device in actual use or working state, and specifically refer to the drawing direction in the drawings. "Inside" and "outside" indicate position relative to the outline of the device.

At present, gray scales selected of a red light picture, a green light picture and a blue light picture are same in display defect compensation of display panel result in errors in interpolation compensation for other unselected gray scale pictures, which makes a white light picture of the display panel appear color deviation after the display defect compensation.

Please refer to FIG. 1 to FIG. 4, a compensation method for a display panel is provided by an embodiment of the present application, and includes steps of:

For each single gray scale image of a preset color displayed by a panel to be compensated, obtaining a corresponding image parameter group.

For each single gray scale image of the preset color displayed by the panel to be compensated, obtaining a corresponding fitting determination coefficient according to the image parameter group.

Obtaining gray scale binding points of the preset color of the panel to be compensated according to the fitting determination coefficients.

Obtaining compensation parameters corresponding to the gray scale binding points of the preset color, and performing display compensation on the panel to be compensated according to the compensation parameters corresponding to the gray scale binding points.

The preset color includes at least one sub-pixel color of the panel to be compensated, the image parameter group includes at least one image parameter pair, the image parameter pair includes a first luminous current value and a first luminance value corresponding to the first luminous current value.

The fitting determination coefficients are obtained according to the image parameter group of the preset color image displayed by the panel to be compensated so as to obtain the gray scale binding points of the preset color image displayed by the panel to be compensated by the present application, which beneficial to reduce compensation errors of other gray scales that are not selected as the gray scale binding points, and improve a problem of color deviation of a white picture of a compensated display panel.

The technical solution of the present application is described in combination with specific embodiments.

The compensation method for the display panel includes steps of:

S100: for each single gray scale image of a preset color displayed by a panel to be compensated, obtaining a corresponding image parameter group.

The preset color includes at least one sub-pixel color of the panel to be compensated.

The preset color can be red, green or blue in an embodiment. The panel before compensation may include a preset color light source. When the preset color is red light, the preset color light source may be a red LED chip, the panel before compensation displays a red light picture. The first luminous current value and the first luminance value respectively correspond to a current value configured to drive the red LED chip to emit light of a corresponding intensity and a luminance value of the panel to be compensated to display the red picture when the panel to be compensation displays the red picture. When the preset color light source is a green luminous light source, the preset color light source can be a green LED chip, the panel to be compensated displays a green light picture. The first luminous current value and the first luminance value respectively correspond to a current value configured to drive the green LED chip to emit light of a corresponding intensity and a luminance value of the panel to be compensated to display the green picture when the panel to be compensation displays the green picture. When the preset color light source is a blue luminous light source, the preset color light source can be a blue LED chip, the panel to be compensated displays a blue light picture. The first luminous current value and the first luminance value respectively correspond to a current value configured to drive the blue LED chip to emit light of a corresponding intensity and a luminance value of the panel to be compensated to display the blue picture when the panel to be compensation displays the blue picture.

S200: for each single gray scale image of the preset color displayed by the panel to be compensated, obtaining a corresponding fitting determination coefficient according to the image parameter group.

In an embodiment, step S200 includes step of:

S210: for each gray scale image of the preset color displayed by the panel to be compensated, obtaining a corresponding first determination coefficient according to the image parameter group corresponding to a gray scale of the single gray scale image.

Figure 2:
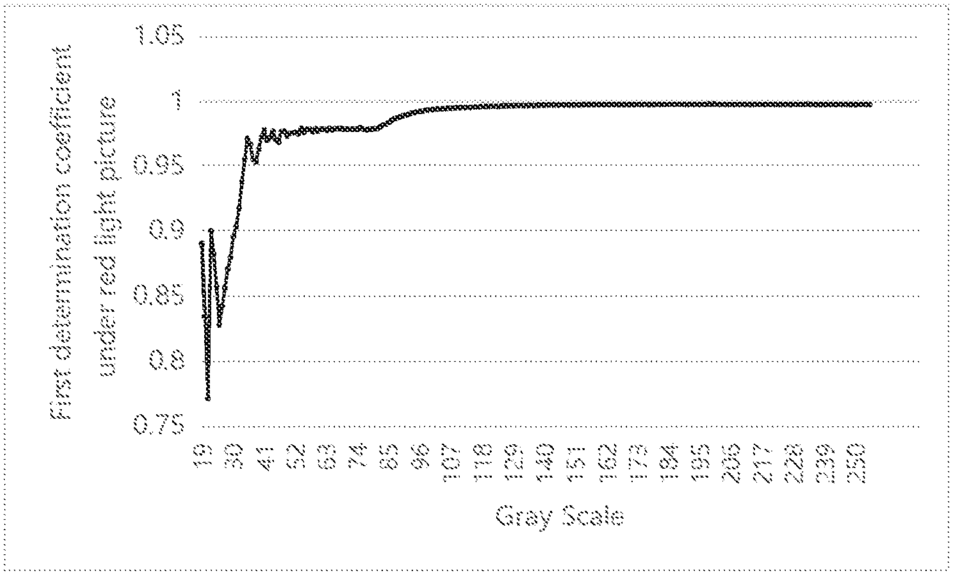
FIG. 2 is a first determination coefficient result corresponding to different gray scales of red light displayed by a panel to be compensated provided by an embodiment of the present application.
Figure 3:
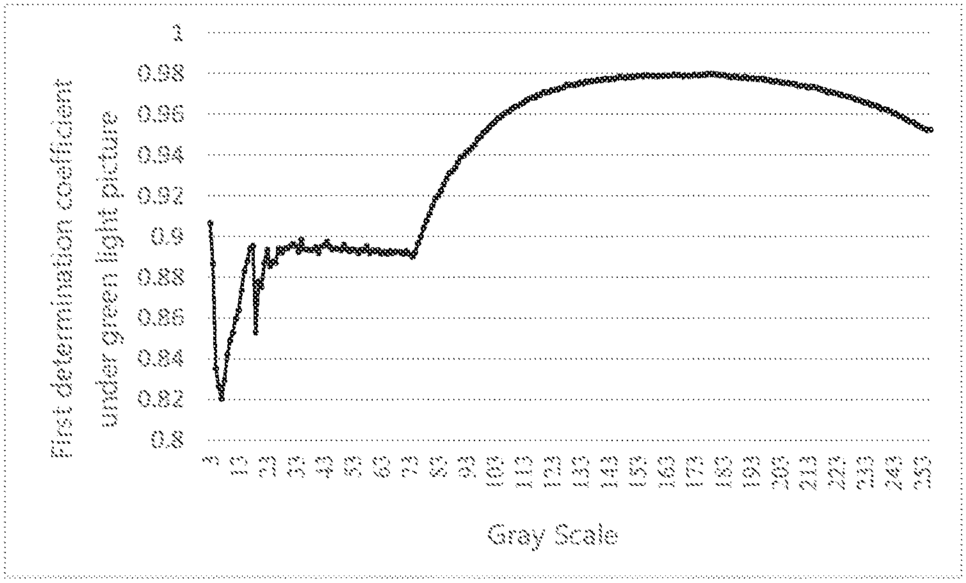
FIG. 3 is a first determination coefficient result corresponding to different gray scales of green light displayed by a panel to be compensated provided by an embodiment of the present application.
Figure 4:
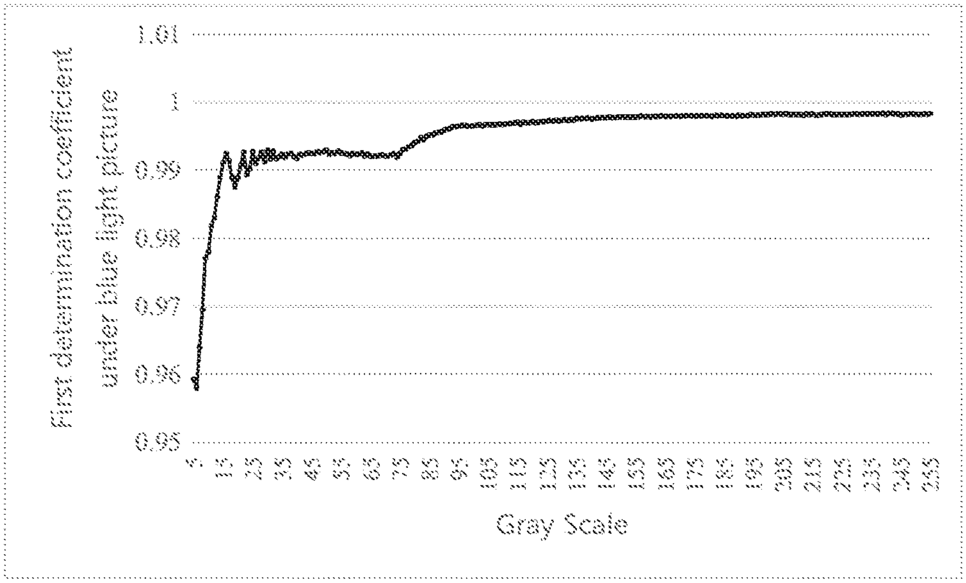
FIG. 4 is a first determination coefficient result corresponding to different gray scales of blue light displayed by a panel to be compensated provided by an embodiment of the present application.

Please refer to FIG. 2 to FIG. 4. In an embodiment, the corresponding first determination coefficient obtained by different gray scales are different when the panel to be compensated displays red light, green light and blue light, respectively.

In an embodiment, S210 also includes steps of:

S211: for each gray scale establishing a corresponding first relational expression according to the image parameter pair for each corresponding gray scale image of the preset color displayed by the panel to be compensated.

The image parameter group corresponding to the each gray scale includes at least one image parameter pair. Each of image parameter pairs includes the first luminous current value and the first luminance value corresponding to the first luminous current value. Assuming that there are x pairs of image parameter pairs in the image parameter groups corresponding to the each of gray scales, then in the image parameter pair corresponding to a nth gray scale, the first luminous current value can be defined as InL. L is greater than zero and is less than or equal to x.

The first relational expression may be a linear relational expression, a quadratic relational expression or a cubic relational expression between the first luminous current value and the first luminance value, or other relational expression that can be satisfied by the first luminous current value and the first luminance value.

When the first relational expression is the linear relational expression of the first luminous current value and the first luminance value, the first relational expression is defined as $L_n=k_n \cdot I_n+m$.

A first linear coefficient is defined as kn. A first constant is defined as m. The first linear coefficient kn is not equal to zero. The first constant m could be zero.

S212: for each gray scale image of the preset color displayed by the panel to be compensated, obtaining the first determination coefficient according to the first relational expression for each corresponding gray scale and the image parameter pair for each corresponding gray scale.

In an embodiment, S212 includes steps of:

S212*a*: obtaining the first fitting luminance value for each corresponding gray scale according to the first luminous current value for each corresponding gray scale and the first relational expression for each corresponding gray scale

S212*b*: obtaining a first average luminous current value for each corresponding gray scale according to the first luminous current value for each corresponding gray scale and the first relational expression for each corresponding gray scale.

S212*c*: obtaining a first average fitting luminance value for each corresponding gray scale according to the first average luminous current value for each corresponding gray scale.

S212*d*: obtaining the first determining coefficient R12 for each corresponding gray scale according to the first luminance value for each corresponding gray scale, the first fitting luminance value for each corresponding gray scale and the first average fitting luminance value for each corresponding gray scale.

A calculation method of the first determination coefficient is defined as $$R_1^2 = \frac{\left(\hat{L}_{1n} - \bar{L}_{1n}\right)^2}{\left(L_{nL} - \bar{L}_{1n}\right)^2}.$$

$\hat{L}_{1n}$ represents a first fitting luminance value of the first luminous current value InL of the nth gray scale substituted into the first relational expression corresponding to the nth gray scale. $L_{nL}$ represents the first luminance value that is actually measured of the nth gray scale. $\bar{L}_{1n}$ in represents the first average fitting luminance value corresponding to the nth gray scale.

In an embodiment, S210 further includes step of:

S213: for each gray scale, establishing a corresponding plurality of fifth relational expressions according to the image parameter pair for each corresponding gray scale image of the preset color displayed by the panel to be compensated.

In an embodiment, the fifth relational expression may be the linear relational expression, the quadratic relational expression or the cubic relational expression between the first luminous current value and the first luminance value, or other relational expression that can be satisfied by the first luminous current value and the first luminance value. The fifth relational expression may be same as or different from the first relational expression.

The fifth relational expression is defined as $L_n=D_n \cdot I_n+e$ when the fifth relational expression is the linear relational expression.

A fourth linear coefficient is defined as Dn. A fourth constant is defined as e. The fourth linear coefficient Dn is not equal to zero. The fourth constant e could be zero.

For example, when a number of the parameter pairs corresponding to the nth gray scale is greater than or equal to 2, the image parameter pairs can be selected to be grouped. Establishing the corresponding plurality of the fifth relational expressions for each corresponding nth gray scale according to each group of image parameter pairs in the nth gray scale image of the preset color displayed by the panel to be compensated.

S213 includes steps of:

S213*a*: the image parameter pairs corresponding to each of the gray scales are divided into N of parameter groups of the preset color image displayed by the panel to be compensated.

N is greater than or equal to 2, and N is an integer.

S213*b*: establishing N of the fifth relational expressions for each corresponding gray scale according to the image parameter pair in each of the parameter groups for each corresponding gray scale of the preset color image displayed by the panel to be compensated.

S214: for each single gray scale image of the preset color displayed by the panel to be compensated, obtaining a corresponding plurality of second predetermined coefficients according to the corresponding plurality of fifth relational expressions for each corresponding gray scale and the image parameter pair for each corresponding gray scale.

In an embodiment, S214 includes steps of:

S214*a*: obtaining a first pre-fitted luminance value corresponding to each of the parameter groups in the gray scale according to the image parameter pairs in each of the parameter groups corresponding to each of the gray scales and the fifth relational expression corresponding to each of the parameter groups.

S214*b*: obtaining a first pre-average luminous current value corresponding to the each of the parameter groups in the gray scales according to the image parameter pair in each of the parameter groups corresponding to the gray scales and the fifth relational expression corresponding to each of parameter groups.

S214*c*: obtaining a corresponding first pre-average fitting luminance value according to the first pre-average luminous current value corresponding to the each of the parameter groups in the gray scales.

S214*d*: obtaining a second predetermined determination coefficient R12 corresponding to the each of the parameter groups in the gray scales according to the first luminance value corresponding to the each of parameter groups in the gray scales, the first pre-fitting luminance value corresponding to the each of parameter groups in the gray scales, and the first pre-average fitting luminance value corresponding to the each of parameter groups in the gray scales.

A calculation method of the second determination coefficient is defined as $$R_{M4}^2 = \frac{(\hat{L}_{4n} - \bar{L}_{4n})^2}{(L_{nL} - \bar{L}_{4n})^2}.$$

M represents a Mth group in the nth gray scale, and M is less than or equal to N. $\hat{L}_{4n}$ on represents the first pre-fitting luminance value of the first luminous current value InL corresponding to the M group substituted into the fifth relational expression corresponding to the nth gray scale at the nth grayscale. $L_{nL}$ represents the first luminance value actually measured at the nth gray scale. $\bar{L}_{4n}$ represents the first pre-average fitting luminance value corresponding to the Mth group in the nth gray scale.

S215: determining the first determination coefficient for each corresponding gray scale according to a maximum value among the plurality of second predetermined determination coefficients for each corresponding gray scale.

S220: determining whether the first determination coefficient is greater than a first threshold, and defining the first determination coefficient as the fitting determination coefficient if yes.

The first threshold may be any value greater than or equal to 0.85 and less than 1, such as 0.85, 0.95, 0.99 and so on.

In an embodiment, S200 further includes steps of:

S230: obtaining a second determination coefficient according to the image parameter pair of the gray scale corresponding to a first determination coefficient less than or equal to the first threshold if the first determination coefficient is not greater than the first threshold.

In an embodiment, S230 further includes steps of:

S231: for each second type of gray scale, establishing a corresponding second relational expression according to the image parameter pair for each corresponding second type of gray scale image of the preset color displayed by the panel to be compensated.

The second type of gray scale is a gray scale corresponding to the first determination coefficient less than or equal to the first threshold.

In an embodiment, the second relational expression may be the linear relational expression, the quadratic relational expression or the cubic relational expression between the first luminous current value and the first luminance value, or other relational expression that can be satisfied by the first luminous current value and the first luminance value. The second relational expression may be same as or different from the first relational expression or the fifth relational expression.

The second relational expression may be the quadratic relational expression between the first luminous current value and the first luminance value. The second relational expression is defined as $L_n=a_n \cdot I_n^2+b_n \cdot I_n+c$.

an is a first square coefficient. bn is a second linear coefficient. and c is a second constant. an is equal to zero. bn and c could be zero.

S232: for each second type of gray scale image of the preset color displayed by the panel to be compensated, obtaining the second determination coefficient according to the second relational expression for each second type of gray scale and the image parameter pair for each second type of gray scale.

In an embodiment, S232 can include steps of:

S232*a*: obtaining second fitting luminance value for each second type of gray scale according to the first luminous current value for each second type of gray scale and the second relational expression for each second type of gray scale.

S232*b*: obtaining second average luminous current value for each second type of gray scale according to the first luminous current value for each second type of gray scale and the second relational expression for each second type of gray scale.

S232*c*: obtaining a second average fitting luminance value for each second type of gray scale according to the second average luminous current value for each second type of gray scale.

S232*d*: for each second type of gray scale obtaining the second determining coefficient R22 according to the first luminance value for each second type of gray scale, the second fitting luminance value for each second type of gray scale and the second average fitting luminance value for each second type of gray scale.

A calculation method of the second determination coefficient is defined as $$R_2^2 = \frac{(\hat{L}_{2n} - \bar{L}_{2n})^2}{(L_n - \bar{L}_{2n})^2}.$$

$\hat{L}_{2n}$ represents the second fitting luminance value of the first luminous current value InL of the nth gray scale in the second type of gray scale substituted into the second relational expression corresponding to the nth gray scale. $L_n$ represents the first luminance value that is actually measured of the nth gray scale in the second type of gray scale. $\bar{L}_{2n}$ represents the second average fitting luminance value corresponding to the nth gray scale in the second type of gray scale.

In an embodiment, S230 also can include steps of:

S233: for each second type of gray scale, establishing a corresponding plurality of second relational expressions according to the image parameter pair for each corresponding second type of gray scale image of the preset color displayed by the panel to be compensated.

In an embodiment, the sixth relational expression may be the linear relational expression, the quadratic relational expression or the cubic relational expression between the first luminous current value and the first luminance value, or other relational expression that can be satisfied by the first luminous current value and the first luminance value. The sixth relational expression may be same as or different from the second relational expression, and the sixth relational expression is different from the first relational expression or the second relational expression.

The sixth relational expression is square relational expression. The sixth relational expression is defined as $L_n=f_n \cdot I_n^2+g_n \cdot I_n+h$.

fn is a fifth square coefficient. gn is a fifth linear coefficient. and h is a fifth constant. fn is equal to zero. gn and h could be zero.

For example, when the number of the parameter pairs corresponding to the nth gray scale in the second type of gray scale is greater than or equal to 2, the image parameter pairs can be selected to be grouped, Establishing the plurality of the sixth relational expressions for each nth gray scale according to each group of image parameter pairs in the nth gray scale image of the preset color displayed by the panel to be compensated.

S233 includes steps of:

S233*a*: the image parameter pairs corresponding to each of second type of gray scales are divided into Y of parameter groups of the preset color image displayed by the panel to be compensated.

Y is greater than or equal to 2, and N is an integer.

S233*b*: establishing N of the sixth relational expressions for each second type of gray scale according to the image parameter pair in each of the second parameter groups corresponding to each of second type of gray scales of the preset color image displayed by the panel to be compensated.

S234: for each second type of gray scale image of the preset color displayed by the panel to be compensated, obtaining a corresponding plurality of third predetermined coefficients according to the corresponding plurality of sixth relational expressions for each corresponding second type of gray scale and the image parameter pair for each c corresponding second type of gray scale.

In an embodiment, S234 includes steps of:

S234*a*: obtaining a second pre-fitted luminance value corresponding to each of the second parameter groups in the second type of gray scales according to the image parameter pairs in each of the parameter groups corresponding to each of the second type gray scales and the sixth relational expression corresponding to the each of the second parameter groups.

S234*b*: obtaining a second pre-average luminous current value corresponding to the each of the second-type parameter groups in the second type of gray scales according to the image parameter pair in each of the second-type parameter groups corresponding to the gray scales and the sixth relational expression corresponding to each of the second-type parameter groups.

S234*c*: obtaining a corresponding second pre-average fitting luminance value according to the second pre-average luminous current value corresponding to the each of the second-type parameter groups in the second type of gray scales.

obtaining a third predetermined determination coefficient RM52 corresponding to the each of the second-type parameter groups in the second type of gray scales according to the first luminance value corresponding to the each of the second-type parameter groups in the second type of gray scales, the second pre-fitting luminance value corresponding to the each of the second-type parameter groups in the second type of gray scales, and the second pre-average fitting luminance value corresponding to the each of the second-type parameter groups in the second type of gray scales.

A calculation method of the third determination coefficient is defined as $$R_{M5}^2 = \frac{\left(\hat{L}_{5n} - \overline{L}_{5n}\right)^2}{\left(L_{nL} - \overline{L}_{5n}\right)^2}.$$

M represents the Mth group in the nth gray scale of the second type of gray scale, and M is less than or equal to N. $\hat{L}_{4n}$ represents the first pre-fitting luminance value of the first luminous current value InL corresponding to the M group substituted into the fifth relational expression corresponding to the nth gray scale at the nth grayscale. $L_{nL}$ represents the first luminance value actually measured at the nth gray scale. $\overline{L}_{4n}$ represents the first pre-average fitting luminance value corresponding to the Mth group in the nth gray scale.

S235: determining the second determination coefficient for each second type of gray scale according to a maximum value among the plurality of third predetermined determination coefficients for each second type of gray scale.

determining whether the second determination coefficient is greater than a second threshold, and defining the second determination coefficient as the fitting determination coefficient if yes.

The second threshold may be any value greater than or equal to 0.85 and less than 1, such as 0.85, 0.95, 0.99 and so on. The second threshold may be same as or different from the first threshold.

In an embodiment, S200 further includes step of:

S250: obtaining a third determination coefficient according to the image parameter pair corresponding to the second type of gray scale of the second determination coefficient less than or equal to the second threshold if the second determination coefficient is not greater than the second threshold, wherein the third determination coefficient as the fitting determination coefficient.

In an embodiment, S250 further includes steps of:

S251: for each third type of gray scale establishing a corresponding third relational expression according to the image parameter pair for each the third type of gray scale image of the preset color displayed by panel to be compensated.

the third type of gray scale is a gray scale corresponding to the second determination coefficient less than or equal to the second threshold.

the third relational expression may be the linear relational expression, the quadratic relational expression or the cubic relational expression between the first luminous current value and the first luminance value, or other relational expression that can be satisfied by the first luminous current value and the first luminance value. The third relational expression may be same as or different from the first relational expression or the fifth relational expression. The third relational expression is different from the first relational expression or the fifth relational expression, and the third relational expression is different from the second relational expression or the sixth relational expression.

The third relational expression may be the cubic relational expression between the first luminous current value and the first luminance value. The third relational expression is defined as $L_n=p_n \cdot I_n^3+q_n \cdot I_n^2+r_n \cdot I_n+s$.

pn is a first cubic coefficient, qn is a second square coefficient, rn is a third linear coefficient, and s is a third constant. pn is not equal to 0, qn, rn, and s could be 0.

S252: for each third type of gray scale image of the preset color displayed by the panel to be compensated, obtaining the corresponding third determination coefficient according to the third relational expression for each third type of gray scale and the image parameter pair for each third type of gray scale. The third determination coefficient as the fitting determination coefficient.

In an embodiment, S252 can include steps of:

S252*a*: for each third type of gray scale obtaining a corresponding third fitting luminance value according to the first luminous current value for each third type of gray scale and the third relational expression for each third type of gray scale.

S232*b*: obtaining third average luminous current value for each the third type of gray scale according to the first luminous current value for each third type of gray scale and the third relational expression for each third type of gray scale.

S252*c*: obtaining third average fitting luminance value for each third type of gray scale according to the third average luminous current value for each third type of gray scale.

S252*d*: obtaining the third determining coefficient R32 for each third type of gray scale according to the first luminance value for each third type of gray scale, the third fitting luminance value for each third type of gray scale and the third average fitting luminance value for each third type of gray scale. The third determination coefficient is the fitting determination coefficient.

A calculation method of the third determination coefficient is defined as $$R_3^2 = \frac{(\hat{L}_{3n} - \bar{L}_{3n})^2}{(L_n - \bar{L}_{3n})^2}.$$

$\hat{L}_{3n}$ represents the third fitting luminance value of the first luminous current value InL of the nth gray scale in the third type of gray scale substituted into the third relational expression corresponding to the nth gray scale. $L_n$ represents the first luminance value that is actually measured of the nth gray scale in the third type of gray scale. $\bar{L}_{3n}$ represents the third average fitting luminance value corresponding to the nth gray scale in the third type of gray scale.

In an embodiment, S200 also can include steps of:

S260: for each gray scale, establishing a corresponding plurality of fourth relational expressions according to the image parameter pair for each corresponding gray scale image of the preset color displayed by the panel to be compensated.

The plurality of the fourth relational expressions may include a first sub-relational expression, a second sub-relational expression and a third sub-relational expression. The first sub-relational expression, the second sub-relational expression and the third sub-relational expression are different from each other and may be one of the linear relational expression, the quadratic relational expression or the cubic relational expression between the first luminous current value and the first luminance value, respectively. For example, the first sub-relational expression may be the linear relational expression between the first luminous current value and the first luminance value, and the second sub-relational expression may be the quadratic relational expression between the first luminous current value and the first luminance value. A quadratic relational expression of a luminance value, the third sub-relational expression may be the cubic relational expression between the first luminous current value and the first luminance value.

S270: for each gray scale image of the preset color displayed by the panel to be compensated obtaining, obtaining a corresponding plurality of first predetermined coefficients according to the plurality of fourth relational expressions for each gray scale and the image parameter pair for each gray scale.

In an embodiment, the first predetermined coefficients include a first type of predetermined coefficient, a second type of predetermined coefficient and a third type of predetermined coefficient.

In an embodiment, S270 includes steps of:

S271: for each gray scale image of the preset color displayed by the panel to be compensated, obtaining the corresponding first type of predetermined coefficient according to the first sub-relational expression for each corresponding gray scale and the image parameter pair for each corresponding gray scale.

S272: for each gray scale image of the preset color displayed by the panel to be compensated, obtaining a corresponding second type of predetermined coefficient according to the second sub-relational expression for each corresponding gray scale and the image parameter pair for each corresponding gray scale.

S273: for each gray scale of image the preset color displayed by the panel to be compensated, obtaining a corresponding third type of predetermined coefficient according to the third sub-relational expression for each corresponding gray scale and the image parameter pair for each corresponding gray scale.

When the first sub-relational expression may be the linear relational expression between the first luminous current value and the first luminance value, the second sub-relational expression may be the quadratic relational expression between the first luminous current value and the first luminance value, and the third sub-relational expression may be the cubic relational expression between the first luminous current value and the first luminance value, an acquisition method of the first type of predetermined determination coefficient of the gray scale corresponding to the first sub-relational expression is same as or similar to an acquisition method of the first determination coefficient of the preset color image displayed by the panel to be compensated. an acquisition method of the second type of predetermined determination coefficient of the gray scale corresponding to the second sub-relational expression is same as or similar to an acquisition method of the second determination coefficient of the preset color image displayed by the panel to be compensated. an acquisition method of the second type of predetermined determination coefficient of the gray scale corresponding to the second sub-relational expression is same as or similar to an acquisition method of the second determination coefficient of the preset color image displayed by the panel to be compensated, and will not be repeated here.

S280. determining a maximum value of plurality of first predetermined coefficients corresponding to the gray scale as the fitting determination coefficient.

In an embodiment, the first type of predetermined coefficient, the second type of predetermined coefficient and the third type of predetermined coefficient are compared with each other, and the maximum value is selected as the fitting determination coefficient.

That is, when a value of the first type of predetermined coefficient corresponding to a gray scale is the largest, the first type of predetermined coefficient is the fitting determination coefficient corresponding to the gray scale.

when a value of the second type of predetermined coefficient corresponding to a gray scale is the largest, the second type of predetermined coefficient is the fitting determination coefficient corresponding to the gray scale.

when a value of the third type of predetermined coefficient corresponding to a gray scale is the largest, the third type of predetermined coefficient is the fitting determination coefficient corresponding to the gray scale.

S300: obtaining gray scale binding points of the preset color of the panel to be compensated according to the fitting determination coefficients.

In an embodiment, S300 includes steps of:

S310: obtaining at least one corresponding gray scale region according to the fitting determination coefficients.

S320: selecting at least one gray scale in the gray scale region as the gray scale binding point.

Gray scales are consecutive position integers in the gray scale region.

The gray scale binding points are selected from an end point of the gray scale region.

In an embodiment, S310 includes step of:

S311: obtaining at least one corresponding first type of gray scale region according to a first type of fitting determination coefficient.

The first type of fitting determination coefficient is greater than the first threshold. The first type of gray scale region includes a first type of gray scale. The first of type gray scale is a gray scale corresponding to the first determination coefficient greater than the first threshold. Alternatively, the first type of fitting determination coefficient is the first type of predetermined determination coefficient, and the first type of gray scale is a gray scale corresponding to the first type of predetermined determination coefficient as the fitting determination coefficient.

In an embodiment, S311 includes steps of:

S311*a*: obtaining a first type of gray scale corresponding to the first type of fitting determination coefficient.

S311*b*: classifying consecutive first type of gray scales into a same first type of gray scale region.

In an embodiment, S311*b* includes steps of:

Arranging the first type of gray scale in order from small to large or from large to small.

Determining whether a tth first type of gray scale is continuous with a (t+1)th first type of gray scale, if yes, then the tth first type of gray scale and the (t+1)th first type of gray scale are classified into a with first type of gray scale region.

The (t+1)th first type of gray scale is classified into a (v+1)th first type of gray scale region if the tth first type of gray scale is not continuous with a (t+1)th first type of gray scale.

t is an integer greater than or equal to 0, and v is an integer greater than or equal to 1.

For example, gray scale values range from 35 to 69, and 78 to 122, respectively, corresponding to the first fitting determination coefficient greater than the first threshold. The gray scale values range from 35 to 69, and 78 to 122 as the first type of gray scale, then consecutive gray scale values from 35 to 69 are the first type of gray scale region, and gray scale values from 78 to 122 are another first type of gray scale region, which can be expressed as [35, 69], [78, 122], respectively.

In an embodiment, S310 further includes steps of:

S312: obtaining at least one corresponding second type of gray scale region according to a second type of fitting determination coefficient.

In an embodiment, S312 includes step of:

S312*a*: obtaining a fourth type of gray scale corresponding to the second type of fitting determination coefficient.

The second type of fitting determination coefficient is greater than the second threshold. The first determination coefficient corresponding to the fourth type of gray scale is less than or equal to the first threshold, and the second determination coefficient corresponding to the fourth type of gray scale is greater than the second threshold. Alternatively, the second type of fitting determination coefficients are the second type of predetermined determination coefficient, and the second type of gray scale is a gray scale corresponding to the second type of predetermined determination coefficient as the fitting determination coefficient.

S312*b*: classifying consecutive fourth type of gray scales into a same second type of gray scale region.

In an embodiment, detailed steps of S312*b* may be similar to those of S311*b*, and will not be repeated here.

In an embodiment, S310 includes steps of:

S313: obtaining at least one corresponding third type of gray scale region according to a third type of fitting determination coefficient.

S313*a*: obtaining third type of gray scale corresponding to the third t type of fitting determination coefficient.

The third type of fitting determination coefficient is same as the third determination coefficient. The first determination coefficient corresponding to the third type of gray scale is less than or equal to the first threshold, and the second determination coefficient corresponding to the third type of gray scale is less than or equal to the second threshold. Alternatively, the third type of fitting determination coefficient is the third type of predetermined coefficient, and the third type of gray scale is a gray scale corresponding to the fitting determination coefficient as the third type of predetermined coefficient.

S313*b*: classifying consecutive third type of gray scales into a same third type of gray scale region.

In an embodiment, detailed steps of S313*b* may be similar to those of S311*b*, and will not be repeated here.

In an embodiment, S320 includes steps of:

S321: selecting at least one first type of gray scale in the first type of gray scale region as a first type of gray scale binding point.

The first type of gray scale binding point is selected from an end point of the first type of gray scale region. For example, the gray scale values range from 35 to 69 as the first type of gray scale, then the gray scale values of the first type of gray scale binding point in the first type of gray scale can be 35 and/or 69.

In an embodiment, S320 includes steps of:

S321: selecting at least one fourth type of gray scale in the second type of gray scale region as a second type of gray scale binding point.

The second type of gray scale binding point is selected from an end point of the second type of gray scale region.

In an embodiment, S320 includes step of:

S323: selecting at least one third type of gray scale in the third type of gray scale region as a third type of gray scale binding point.

The third type of gray scale binding point is selected from an end point of the third type of gray scale region.

S400: obtaining compensation parameters corresponding to the gray scale binding points of the preset color, and performing display compensation on the panel to be compensated according to the compensation parameters corresponding to the gray scale binding point In an embodiment, S400 includes step of:

S410: obtaining a first compensation parameter corresponding to adjacent two of the gray scale binding points of the preset color.

In an embodiment, S410 includes steps of:

S422: obtaining the first compensation parameter corresponding to adjacent two of the first type of gray scale binding points of the preset color.

The adjacent two of the first type of gray scale binding points may belong to a same first type of gray scale region.

The first compensation parameter may be a first compensation luminance value and/or a first compensation current value.

In an embodiment, S410 further includes steps of:

S412: obtaining the first compensation parameter corresponding to adjacent two of the second type of gray scale binding points of the preset color.

The adjacent two of the second type of gray scale binding points may belong to a same second type of gray scale region.

In an embodiment, S410 further includes steps of:

S413 obtaining the first compensation parameter corresponding to adjacent two of the third of gray scale binding points of the preset color.

The adjacent two of the third of gray scale binding points may belong to a same third type of gray scale region.

S420: obtaining a second compensation parameter corresponding to a gray scale in a gray scale region between the adjacent two of gray scale binding points according to a relational expression corresponding to the fitting determination coefficients of a plurality of gray scales in the gray scale region between the adjacent two of gray scale binding points.

The second compensation parameter may be a second compensation luminance value and a second compensation current value corresponding to the second compensation luminance value.

In an embodiment, S420 further includes step of:

S421: obtaining the second compensation parameter corresponding to the first type of gray scale in the first type of gray scale region between the adjacent two of the first type of gray scale binding points according to a first type of relational expression corresponding to the first type of fitting determination coefficients of a plurality of first type of gray scales between the adjacent two of first type of gray scale binding points.

In an embodiment, S421 further includes steps of:

S421*a*: establishing the first-type relational expression corresponding to the first-type fitting determination coefficients corresponding to the plurality of first-type gray-scales between the adjacent two of first-type gray scale binding points according to the first compensation parameter corresponding to adjacent two of first-type gray scale binding points and the first relational expression or the fifth relational expression respectively corresponding to a plurality of first-type gray scales between the adjacent two of first-type gray scale binding points.

For example, when the first relational expression or the fifth relational expression is the linear relational expression between the first luminous current value and the first luminance value, the first-type relational expression corresponding to the first-type fitting determination coefficient corresponding to the plurality of first-type gray scale between the adjacent two of first-type gray scale binding points is the linear relational expression between the second compensation luminance value corresponding to the first-type gray scale and the second compensation current value corresponding to the second compensation luminance value.

In an embodiment, S420 further includes step of:

S422: obtaining the second compensation parameter corresponding to the second type of gray scale in the second type of gray scale region between the adjacent two of second type of gray scale binding points according to a second type of relational expression corresponding to the second type of fitting determination coefficients of a plurality of second type of gray scales between the adjacent two of second type of gray scale binding points.

In an embodiment, S422 further includes steps of:

S422*a*: establishing the second-type relational expression corresponding to the second-type fitting determination coefficients corresponding to the plurality of second-type gray scales between the adjacent two of second-type gray scale binding points according to the first compensation parameter corresponding to adjacent two of second-type gray scale binding points and the second relational expression or the sixth relational expression respectively corresponding to a plurality of second-type gray scales between the adjacent two of second-type gray scale binding points.

For example, when the second relational expression or the sixth relational expression is the quadratic relational expression between the first luminous current value and the first luminance value, the second-type relational expression corresponding to the second-type fitting determination coefficient corresponding to the plurality of second-type gray scale between the adjacent two of second-type gray scale binding points is the quadratic relational expression between the second compensation luminance value corresponding to the second-type gray scale and the second compensation current value corresponding to the second compensation luminance value.

In an embodiment, S420 further includes step of:

S423: obtaining the second compensation parameter corresponding to the third-type gray scale in the third-type gray scale region between the adjacent two of third-type gray scale binding points according to a third-type relational expression corresponding to the third-type fitting determination coefficients of a plurality of third-type gray scales between the adjacent two of third-type gray scale binding points.

In an embodiment, S423 further includes steps of:

S423*a*: establishing the third-type relational expression corresponding to the third-type fitting determination coefficients corresponding to the plurality of third-type gray scales between the adjacent two of second-type gray scale binding points according to the first compensation parameter corresponding to adjacent two of third-type gray scale binding points and the third relational expression respectively corresponding to a plurality of third-type gray scales between the adjacent two of third-type gray scale binding points.

For example, when the third relational expression is the cubic expression between the first luminous current value and the first luminance value, the third-type relational expression corresponding to the third-type fitting determination coefficient corresponding to the plurality of third-type gray scale between the adjacent two of third-type gray scale binding points is the cubic relational expression between the second compensation luminance value corresponding to the third-type gray scale and the second compensation current value corresponding to the second compensation luminance value.

S430: performing display compensation on the panel to be compensated according to the first compensation parameter and the second compensation parameter.

In an embodiment, S430 further includes step of:

S431: performing display compensation on the panel to be compensated according to the first compensation parameter corresponding to the first-type gray scale binding points and the second compensation parameter corresponding to the first-type gray scale in the first type of gray scale region between the adjacent two of first type of gray scale binding points.

In an embodiment, S430 further includes step of:

S432: performing display compensation on the panel to be compensated according to the first compensation parameter corresponding to the second-type gray scale binding points and the second compensation parameter corresponding to the second-type gray scale in the second-type gray scale region between the adjacent two of second-type gray scale binding points.

In an embodiment, S430 further includes step of:

performing display compensation on the panel to be compensated according to the first compensation parameter corresponding to the third-type gray scale binding points and the second compensation parameter corresponding to the third-type gray scale in the third-type gray scale region between the adjacent two of third-type gray scale binding points.

In an embodiment, the panel to be compensated includes pixels, each of the pixels includes a plurality of types of sub-pixels, each of the types of sub-pixels corresponds to a different color, and the preset color includes a color corresponding to the each of types of the sub-pixels.

The fitting determination coefficients are obtained according to the image parameter groups of the preset color image displayed by the panel to be compensated so as to obtain the gray scale binding point of the preset color image displayed by the panel to be compensated in an embodiment of the present application, which beneficial to reduce compensation errors of other gray scales that are not selected as the gray scale binding point, and improve a problem of color deviation of a white picture of a compensated display panel.

Figure 5:
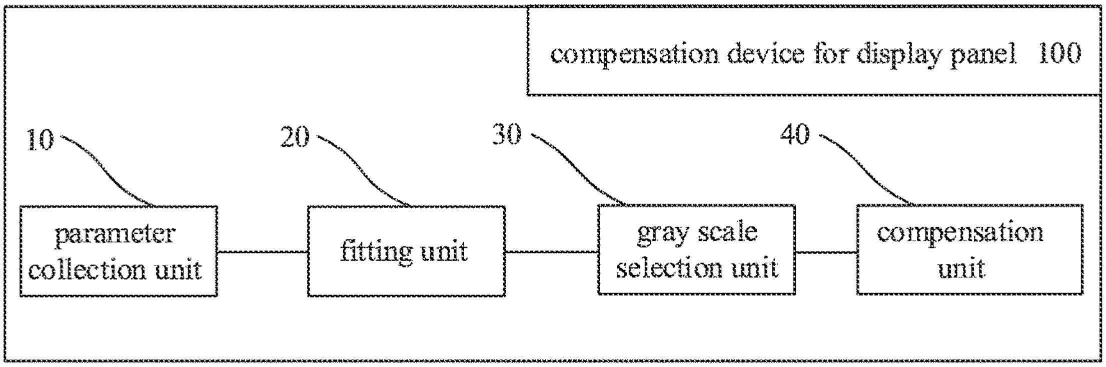
FIG. 5 is a schematic diagram of a compensation device for a display panel provided by an embodiment of the present application.

Referring to FIG. 5, a compensation device 100 for the display panel is also provided by the present application, including:

A parameter collection unit 10 configured for each gray scale image of a preset color displayed by a panel to be compensated to obtain an image parameter group.

the preset color includes at least one sub-pixel color of the panel to be compensated, the image parameter group includes at least one image parameter pair, the image parameter pair includes a first luminous current value and a first luminance value corresponding to the first luminous current value.

a fitting unit 20 configured for each gray scale image of the preset color displayed by the panel to be compensated to obtain a fitting determination coefficient according to the image parameter group.

a gray scale selection unit 30 configured to obtain gray scale binding points of the preset color of the panel to be compensated according to the fitting determination coefficient.

a compensation unit 40 configured to obtain a compensation parameter corresponding to the gray scale binding point of the preset color, and performing display compensation on the panel to be compensated according to the compensation parameter corresponding to the gray scale binding point.

In an embodiment, the fitting unit 20 includes a first fitting subunit, the first fitting subunit is configured for obtaining first determination coefficients each corresponding to the gray scale of the preset color displayed by the panel to be compensated according to the image parameter groups each corresponding to the gray scale.

In an embodiment, the first fitting subunit includes a first fitting part and a second fitting part. The first fitting part is configured for establishing first relational expressions each corresponding to the gray scale according to the image parameter pairs each corresponding to the gray scale of the preset color image displayed by the panel to be compensated. The second part is configured for obtaining the first determination coefficients each corresponding to the gray scale of the preset color image displayed by the panel to be compensated according to the first determination coefficients each corresponding to the gray scale and the image parameter pairs each corresponding to the gray scale. The first relational expressions are defined as $L_n=k_n\cdot I_n+m$, the first linear coefficient is defined as kn. the first constant is defined as m. The first linear coefficient kn is not equal to zero. The first constant m could be zero.

In an embodiment, the first fitting subunit may include a third fitting part, a fourth fitting part and a fifth fitting part. The third fitting part is configured for establishing a plurality of fifth relational expressions each corresponding to the gray scale according to the image parameter pairs each corresponding to the gray scale of the preset color image displayed by the panel to be compensated. The fourth part is configured for obtaining, respectively, a plurality of second predetermined coefficients each corresponding to the gray scale of the preset color image displayed by the panel to be compensated according to the plurality of fifth relational expressions each corresponding to the gray scale and the image parameter pairs each corresponding to the gray scale. The fifth part is configured for determining the first determination coefficients each corresponding to the gray scale according to a maximum value among the plurality of second predetermined determination coefficients each corresponding to the gray scale. The fifth relational expressions are defined as $L_n=D_n\cdot I_n+e$.

The fourth linear coefficient is defined as Dn. The fourth constant is defined as e. The fourth linear coefficient Dn is not equal to zero. The fourth constant e could be zero.

The fitting unit 20 also includes a first determining subunit in an embodiment. The first determining subunit is configured for determining whether the first determination coefficients are greater than a first threshold, and if yes, defining the first determination coefficients as the fitting determination coefficients.

The fitting unit 20 also includes a second determining subunit in an embodiment. The second determining subunit is configured for obtaining second determination coefficients according to the image parameter pair corresponding to the gray scale of the first determination coefficients less than or equal to the first threshold if the first determination coefficients are not greater than the first threshold when the first determining subunit determines that the first determination coefficient is less than or equal to the first threshold.

The second fitting subunit includes a sixth fitting part and a seventh fitting part. The sixth fitting part is configured for establishing second relational expressions each corresponding to a second type of gray scale according to the image parameter pairs each corresponding to the second type of gray scale of the preset color image displayed by the panel to be compensated. The seventh fitting part is configured for obtaining the second determination coefficients each corresponding to the second type of gray scale of the preset color image displayed by the panel to be compensated according to the second relational expressions each corresponding to the second type of gray scale and the image parameter pairs each corresponding to the second type of gray scale. The second relational expressions are defined as $L_n=a_n\cdot I_n^2+b_n\cdot I_n+c$. an is a first square coefficient. bn is a second linear coefficient. and c is a second constant. an is equal to zero. bn and c could be zero.

The second fitting subunit also includes an eighth fitting part, a ninth fitting part and a tenth fitting part in an embodiment. The eighth fitting part is configured for establishing a plurality of sixth relational expressions each corresponding to the second type of gray scale according to the image parameter pairs each corresponding to the second type of gray scale of the preset color image displayed by the panel to be compensated. The ninth fitting part is configured for obtaining, respectively, a plurality of third predetermined coefficients each corresponding to the second type of gray scale of the preset color image displayed by the panel to be compensated according to the plurality of sixth relational expressions each corresponding to the second type of gray scale and the image parameter pairs each corresponding to the second type of gray scale. The tenth fitting part is configured for determining the second determination coefficients each corresponding to the second type of gray scale according to a maximum value among the plurality of third predetermined determination coefficients each corresponding to the second type of gray scale. The sixth relational expression is defined as $L_n=f_n \cdot I_n^2+g_n \cdot I_n+h$.

fn is a fifth square coefficient. gn is a fifth linear coefficient. and h is a fifth constant. fn is equal to zero. gn and h could be zero.

The fitting unit 20 also includes a second determining subunit in an embodiment. The second determining subunit is configured for determining whether the second determination coefficients are greater than a second threshold, and if yes, defining the second determination coefficients as the fitting determination coefficients.

The fitting unit 20 also includes a third determining subunit in an embodiment. The third determining subunit is configured for obtaining third determination coefficients according to the image parameter pair corresponding to the second type of gray scale of the second determination coefficients less than or equal to the second threshold when the second determination subunit determines that the second determination coefficient is less than or equal to the second threshold.

The third fitting subunit includes an eleventh fitting part and a twelfth fitting part in an embodiment. The eleventh fitting part is configured for establishing third relational expressions each corresponding to a third type of gray scale according to the image parameter pairs each corresponding to the third type of gray scale of the preset color image displayed by panel to be compensated. The twelfth fitting part is configured for obtaining the third determination coefficients each corresponding to the third type of gray scale of the preset color image displayed by the panel to be compensated according to the third relational expressions each corresponding to the third type of gray scale and the image parameter pairs corresponding to the third type of gray scale. The third determination coefficients as the fitting determination coefficients. The third relational expressions are defined as $L_n=p_n \cdot I_n^3+q_n \cdot I_n^2+r_n \cdot I_n+s$. pn is a first cubic coefficient, qn is a second square coefficient, rn is a third linear coefficient, and s is a third constant. pn is not equal to 0, qn, rn, and s could be 0.

The fitting unit 20 can also include a third fitting subunit, the third fitting subunit includes a thirteenth fitting part, a fourteenth fitting part and an acquisition part in an embodiment. The thirteenth fitting part is configured for establishing a plurality of fourth relational expressions each corresponding to the gray scale according to the image parameter pairs each corresponding to the gray scale of the preset color image displayed by the panel to be compensated. The fourteenth fitting part is configured for obtaining, respectively, a plurality of first predetermined coefficients each corresponding to the gray scale of the preset color image displayed by the panel to be compensated according to the plurality of fourth relational expressions each corresponding to the gray scale and the image parameter pairs each corresponding to the gray scale. The acquisition part is configured for determining a maximum value among a plurality of first predetermined coefficients corresponding to the gray scale as the fitting determination coefficients.

The gray scale selection unit 30 includes a gray scale corresponding subunit and a representative gray scale output subunit in an embodiment. The gray scale corresponding subunit is configured for obtaining at least one corresponding gray scale region according to the fitting determination coefficients of the gray scales. The representative gray scale output subunit is configured for selecting at least one gray scale in the gray scale region as a representative gray scale binding point.

The compensation unit 40 includes a first acquisition subunit, a second acquisition subunit and a compensation subunit in an embodiment. The first acquisition subunit is configured for obtaining a first compensation parameter corresponding to adjacent two of gray scale binding points of the preset color. The second acquisition subunit is configured for obtaining a second compensation parameter corresponding to the gray scale in the gray scale region between the adjacent two of gray scale binding points according to a relational expression corresponding to the fitting determination coefficients of a plurality of gray scales in the gray scale region between the adjacent two of gray scale binding points. The compensation subunit is configured for performing display compensation on the panel to be compensated according to the first compensation parameter and the second compensation parameter.

In an embodiment, the panel to be compensated includes pixels, each of the pixels includes a plurality of types of sub-pixels, each of the types of sub-pixels corresponds to a different color, and the preset color includes a color corresponding to the each of types of the sub-pixels.

The compensation device of the display panel provided in an embodiment of the present application obtains the fitting determination coefficients are obtained according to the image parameter groups of the preset color image displayed by the panel to be compensated so as to obtain the gray scale binding point of the preset color image displayed by the panel to be compensated, which beneficial to reduce compensation errors of other gray scales that are not selected as the gray scale binding point, and improve a problem of color deviation of a white picture of a compensated display panel.

The compensation method for the display panel and the compensation device thereof are provided in embodiments of the present application. The compensation method for the display panel includes: for each single gray scale image of a preset color displayed by a panel to be compensated, obtaining a corresponding image parameter group, for each single gray scale image of the preset color displayed by the panel to be compensated, obtaining a corresponding fitting determination coefficient according to the image parameter group, obtaining gray scale binding points of the preset color of the panel to be compensated according to the fitting determination coefficients, obtaining compensation parameters corresponding to the gray scale binding points of the preset color, and performing display compensation on the panel to be compensated according to the compensation parameters corresponding to the gray scale binding points. The fitting determination coefficients are obtained according to the image parameter group of the preset color image displayed by the panel to be compensated so as to obtain the gray scale binding points of the preset color image displayed by the panel to be compensated, which beneficial to reduce compensation errors of other gray scales that are not selected as the gray scale binding point, and improve a problem of color deviation of a white picture of a compensated display panel.

The compensation method for the display panel and the compensation device thereof provided in embodiments of the present application have been introduced in detail above, and the principles and implementations of the present application are described with specific examples. The description of the above embodiment is only used to help understand the method of the present application and its core idea. Further, those skilled in the art may change the specific implementation and application scope according to the idea of the application. In summary, the content of this specification should not be construed as a limitation to the present application.

What is claimed is:

1. A compensation method for a display panel, comprising:

obtaining a corresponding image parameter group for each single gray scale image of a preset color displayed by a panel to be compensated; wherein the preset color comprises at least one sub-pixel color of the panel to be compensated, the image parameter group comprises at least one image parameter pair, and the image parameter pair comprises a first luminous current value and a first luminance value corresponding to the first luminous current value;

obtaining a corresponding fitting determination coefficient for each single gray scale image of the preset color displayed by the panel to be compensated according to the first luminous current value and the first luminance value;

obtaining gray scale binding points of the preset color of the panel to be compensated according to the fitting determination coefficient; and obtaining compensation parameters corresponding to the gray scale binding points of the preset color, and performing display compensation on the panel to be compensated according to the compensation parameters corresponding to the gray scale binding points;

wherein obtaining the corresponding fitting determination coefficient for each single gray scale image of the preset color displayed by the panel to be compensated according to the first luminous current value and the first luminance value comprises steps of:

obtaining a corresponding first determination coefficient for each gray scale image of the preset color displayed by the panel to be compensated according to the first luminous current value and the first luminance value corresponding to a gray scale of the single gray scale image; wherein the first determination coefficient $R_1^2$ satisfies the equation:

$$R_1^2 = \frac{(\hat{L}_{1n} - \bar{L}_{1n})^2}{(L_{nL} - \bar{L}_{1n})^2},$$

wherein $\hat{L}_{1n}$ represents the first fitting luminance value of the first luminous current value of the nth gray scale substituted into the first relational expression corresponding to a nth gray scale, $L_{nL}$ represents the first luminance value measured under the nth gray scale, and $\bar{L}_{1n}$ represents the first average fitting luminance value corresponding to the nth gray scale; and determining whether the first determination coefficient is greater than a first threshold, and defining the first determination coefficient as the fitting determination coefficient according to the first determination coefficient being greater than the first threshold;

wherein obtaining the corresponding first determination coefficient for each gray scale image of the preset color displayed by the panel to be compensated according to the first luminous current value and the first luminance value for each gray scale comprises steps of:

establishing a corresponding first relational expression for each gray scale according to the image parameter pair for each corresponding gray scale image of the preset color displayed by the panel to be compensated; and obtaining the first determination coefficient for each gray scale image of the preset color displayed by the panel to be compensated according to the first relational expression for each corresponding gray scale and the image parameter pair for each corresponding gray scale;

wherein the first relational expression is a linear relational expression, a quadratic relational expression, or a cubic relational expression between the first luminous current value and the first luminance value; wherein the step of obtaining the first determination coefficient according to the first relational expression for each corresponding gray scale and the image parameter pair for each corresponding gray scale comprises:

obtaining a first fitting luminance value for each corresponding gray scale according to the first luminous current value for each corresponding gray scale and the first relational expression for each corresponding gray scale;

obtaining a first average luminous current value for each corresponding gray scale according to the first luminous current value for each corresponding gray scale and the first relational expression for each corresponding gray scale;

obtaining a first average fitting luminance value for each corresponding gray scale according to the first average luminous current value for each corresponding gray scale; and obtaining the first determining coefficient for each corresponding gray scale according to the first luminance value for each corresponding gray scale, the first fitting luminance value for each corresponding gray scale, and the first average fitting luminance value for each corresponding gray scale.

2. The compensation method for the display panel according to claim 1, wherein determining whether the first determination coefficient is greater than the first threshold comprises steps of:

obtaining a second determination coefficient according to the image parameter pair of the gray scale corresponding to a first determination coefficient less than or equal to the first threshold, and according to the first determination coefficient being not greater than the first threshold; and determining whether the second determination coefficient is greater than a second threshold, and defining the second determination coefficient as the fitting determination coefficient according to the second determination coefficient being greater than the second threshold.

3. The compensation method for the display panel according to claim 2, wherein obtaining the second determination coefficient according to the image parameter pair of the gray scale corresponding to the first determination coefficient less than or equal to the first threshold comprises steps of:

establishing a corresponding second relational expression for each second type of gray scale according to the image parameter pair for each corresponding second type of gray scale image of the preset color displayed by the panel to be compensated; and obtaining the second determination coefficient for each second type of gray scale image of the preset color displayed by the panel to be compensated according to the second relational expression for each second type of gray scale and the image parameter pair for each second type of gray scale; and wherein the second type of gray scale is a gray scale corresponding to a first determination coefficient less than or equal to the first threshold.

4. The compensation method for the display panel according to claim 2, wherein determining whether the second determination coefficient is greater than the second threshold further comprises step of:

obtaining a third determination coefficient according to the image parameter pair of the gray scale corresponding to a second determination coefficient less than or equal to the second threshold, and according to the second determination coefficient being not greater than the second threshold, and defining the third determination coefficient as the fitting determination coefficient.

5. The compensation method for the display panel according to claim 4, wherein obtaining the third determination coefficient according to the image parameter pair of the gray scale corresponding to the second determination coefficient less than or equal to the second threshold, and defining the third determination coefficient as the fitting determination coefficient comprises steps of:

establishing a third relational expression for each third type of gray scale according to the image parameter pair for each corresponding third type of gray scale image of the preset color displayed by panel to be compensated; and obtaining the third determination coefficient for each third type of gray scale image of the preset color displayed by the panel to be compensated according to the third relational expression for each corresponding third type of gray scale and the image parameter pair corresponding to the third type of gray scale, and defining the third determination coefficient as the fitting determination coefficient; and wherein the third type of gray scale is a gray scale corresponding to a second determination coefficient less than or equal to the second threshold.

6. The compensation method for the display panel according to claim 1, wherein obtaining the fitting determination coefficient for each single gray scale image of the preset color displayed by the panel to be compensated according to the first luminous current value and the first luminance value comprises steps of:

establishing a corresponding plurality of fourth relational expressions for each gray scale according to the image parameter pair for each corresponding gray scale image of the preset color displayed by the panel to be compensated;

respectively obtaining a corresponding plurality of first predetermined coefficients for each gray scale image of the preset color displayed by the panel to be compensated according to the plurality of fourth relational expressions for each corresponding gray scale and the image parameter pairs for each corresponding gray scale; and defining a maximum value of the plurality of first predetermined coefficients corresponding to the gray scale as the fitting determination coefficient.

7. The compensation method for the display panel according to claim 1, wherein obtaining the gray scale binding point of the preset color of the panel to be compensated according to the fitting determination coefficients comprises steps of:

obtaining at least one corresponding gray scale region according to the fitting determination coefficients; and selecting at least one gray scale in the gray scale region as the gray scale binding point; and wherein gray scales are consecutive position integers in the gray scale region.

8. The compensation method for the display panel according to claim 7, wherein the gray scale binding point is selected from an endpoint of the gray scale region.

9. The compensation method for the display panel according to claim 7, wherein obtaining the compensation parameters corresponding to the gray scale binding points of the preset color and performing display compensation on the panel to be compensated according to the compensation parameters corresponding to the gray scale binding points comprises steps of:

obtaining a first compensation parameter corresponding to adjacent two of the gray scale binding points of the preset color;

obtaining a second compensation parameter corresponding to a gray scale in a gray scale region between the adjacent two of gray scale binding points according to a relational expression corresponding to the fitting determination coefficients of a plurality of gray scales in the gray scale region between the adjacent two of gray scale binding points; and performing display compensation on the panel to be compensated according to the first compensation parameter and the second compensation parameter.

10. The compensation method for the display panel according to claim 1, wherein the panel to be compensated comprises pixels, each of the pixels comprises a plurality of types of sub-pixels, each of the types of sub-pixels corresponds to a different color, and the preset colors comprise corresponding colors for each type of the sub-pixels.

11. The compensation method for the display panel according to claim 6, wherein the plurality of the fourth relational expressions comprises a first sub-relational expression, a second sub-relational expression, and a third sub-relational expression, the first sub-relational expression is a linear relational expression between the first luminous current value and the first luminance value, the second sub-relational expression is a quadratic relational expression between the first luminous current value and the first luminance value, and the third sub-relational expression is a cubic relational expression between the first luminous current value and the first luminance value;

wherein the step of obtaining a corresponding plurality of first predetermined coefficients according to the plurality of fourth relational expressions for each gray scale and the image parameter pair for each gray scale comprises:

obtaining a corresponding first type of predetermined coefficient for each gray scale image of the preset color displayed by the panel to be compensated according to the first sub-relational expression for each corresponding gray scale and the image parameter pair for each corresponding gray scale;

obtaining a corresponding second type of predetermined coefficient for each gray scale image of the preset color displayed by the panel to be compensated according to the second sub-relational expression for each corresponding gray scale and the image parameter pair for each corresponding gray scale; and obtaining a corresponding third type of predetermined coefficient for each gray scale of image the preset color displayed by the panel to be compensated according to the third sub-relational expression for each corresponding gray scale and the image parameter pair for each corresponding gray scale; and wherein in the step of defining a maximum value of the plurality of first predetermined coefficients corresponding to the gray scale as the fitting determination coefficient, a maximum value of the first type of predetermined coefficient, the second type of predetermined coefficient, and the third type of predetermined coefficient is selected as the fitting determination coefficient.

12. The compensation method for the display panel according to claim 9, wherein the first compensation parameter is a first compensation luminance value and/or a first compensation current value.

13. A compensation device for a display panel, comprising:

a parameter collection unit configured for each gray scale image of a preset color displayed by a panel to be compensated to obtain an image parameter group; wherein the preset color comprises at least one sub-pixel color of the panel to be compensated, the image parameter group comprises at least one image parameter pair, and the image parameter pair comprises a first luminous current value and a first luminance value corresponding to the first luminous current value;

a fitting unit configured for each gray scale image of the preset color displayed by the panel to be compensated to obtain a fitting determination coefficient according to the first luminous current value and the first luminance value;

a gray scale selection unit configured to obtain gray scale binding points of the preset color of the panel to be compensated according to the fitting determination coefficient; and a compensation unit configured to obtain a compensation parameter corresponding to the gray scale binding point of the preset color, and performing display compensation on the panel to be compensated according to the compensation parameter corresponding to the gray scale binding point;

wherein the compensation device for the display panel is used in the compensation method for the display panel as claimed in claim 1.

14. A compensation method for a display panel, comprising:

obtaining a corresponding image parameter group for each single gray scale image of a preset color displayed by a panel to be compensated; wherein the preset color comprises at least one sub-pixel color of the panel to be compensated, the image parameter group comprises at least one image parameter pair, and the image parameter pair comprises a first luminous current value and a first luminance value corresponding to the first luminous current value;

obtaining a corresponding fitting determination coefficient for each single gray scale image of the preset color displayed by the panel to be compensated according to the first luminous current value and the first luminance value;

obtaining gray scale binding points of the preset color of the panel to be compensated according to the fitting determination coefficient; and obtaining compensation parameters corresponding to the gray scale binding points of the preset color, and performing display compensation on the panel to be compensated according to the compensation parameters corresponding to the gray scale binding points;

wherein obtaining the fitting determination coefficient for each single gray scale image of the preset color displayed by the panel to be compensated according to the first luminous current value and the first luminance value comprises steps of:

establishing a corresponding plurality of fourth relational expressions for each gray scale according to the image parameter pair for each corresponding gray scale image of the preset color displayed by the panel to be compensated;

respectively obtaining a corresponding plurality of first predetermined coefficients for each gray scale image of the preset color displayed by the panel to be compensated according to the plurality of fourth relational expressions for each corresponding gray scale and the image parameter pairs for each corresponding gray scale; and defining a maximum value of the plurality of first predetermined coefficients corresponding to the gray scale as the fitting determination coefficient;

wherein the plurality of the fourth relational expressions comprises a first sub-relational expression, a second sub-relational expression, and a third sub-relational expression, the first sub-relational expression is a linear relational expression between the first luminous current value and the first luminance value, the second sub-relational expression is a quadratic relational expression between the first luminous current value and the first luminance value, and the third sub-relational expression is a cubic relational expression between the first luminous current value and the first luminance value; wherein the step of obtaining a corresponding plurality of first predetermined coefficients according to the plurality of fourth relational expressions for each gray scale and the image parameter pair for each gray scale comprises:

obtaining a corresponding first type of predetermined coefficient for each gray scale image of the preset color displayed by the panel to be compensated according to the first sub-relational expression for each corresponding gray scale and the image parameter pair for each corresponding gray scale;

obtaining a corresponding second type of predetermined coefficient for each gray scale image of the preset color displayed by the panel to be compensated according to the second sub-relational expression for each corresponding gray scale and the image parameter pair for each corresponding gray scale; and obtaining a corresponding third type of predetermined coefficient for each gray scale of image the preset color displayed by the panel to be compensated according to the third sub-relational expression for each corresponding gray scale and the image parameter pair for each corresponding gray scale; and wherein in the step of defining a maximum value of the plurality of first predetermined coefficients corresponding to the gray scale as the fitting determination coefficient, a maximum value of the first type of predetermined coefficient, the second type of predetermined coefficient, and the third type of predetermined coefficient is selected as the fitting determination coefficient.

* * * * *